C. VITEK.
CLAMP.
APPLICATION FILED DEC. 8, 1919.

1,382,813.

Patented June 28, 1921.

INVENTOR
Charles Vitek
BY
Frank Schmalder Jr.
Attorney.

UNITED STATES PATENT OFFICE.

CHARLES VITEK, OF OMAHA, NEBRASKA.

CLAMP.

1,382,813.   Specification of Letters Patent.   Patented June 28, 1921.

Application filed December 8, 1919. Serial No. 343,211.

*To all whom it may concern:*

Be it known that I, CHARLES VITEK, a citizen of the Republic of Czechoslovakia, residing at Omaha, in the county of Douglas and State of Nebraska, have invented a new and useful Improvement in Clamps, of which the following is a specification.

This invention relates to improvements in hose clamps.

An object of the invention is to provide a hose or pipe clamp in which, through simple manipulation of an adjusting screw, the entire circumference of the outer hose or pipe, and particularly the side walls of the same, are firmly gripped and pressed against the inner one.

Another object of the invention is to provide means in this clamp for positively releasing the legs of the clamp from the side walls when it is desired to disconnect one of the tubular members from the other.

It is, furthermore, an object of the invention to provide a novel form of a hose clamp, which can be manufactured at very small expense, and which can be manipulated in a very simple way for fastening two tubular members at their telescoping ends to each other.

With these and other objects in view, an embodiment of the invention is illustrated in the accompanying drawing, and is described in the following specification, the novel features being pointed out in the appended claims.

Figure 1:
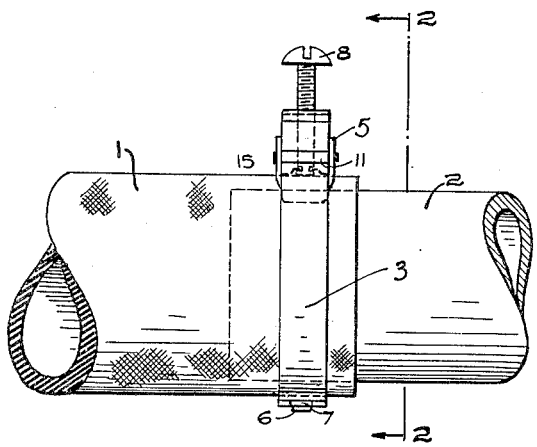
Figure 1 is a side elevation of the clamp.
Figure 2:
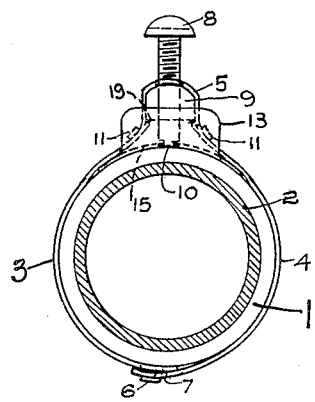
Fig. 2 is an end elevation of the same.
Figure 5:
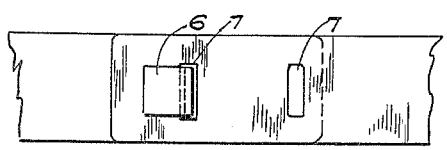
Fig. 5 is a bottom plan view showing the connecting means of the two legs of the clamp.

In Fig. 1 the clamp is illustrated in position to connect two telescoping tubular members; namely, a flexible hose 1 and a rigid pipe 2. Unions of this kind are, for instance, encountered in motor vehicles for completing the path of circulation of the cooling water through the radiator. The clamp proper comprises a flexible strip of metal bent into the shape of semicircular legs 3 and 4, which are united near their top ends by an integral bridge member 5 raised above the highest point of the tubular part, to which the clamp is to be attached. The free ends of the legs may be interconnected at the bottom by slots and tongues as shown in Figs. 2 and 5. The clamp may readily be adjusted to pipes of larger or smaller diameter, depending upon the insertion of the tongue 6 on one leg into one or the other of the slots 7 of the other leg.

A screw 8 is inserted through the bridge portion 5 of the clamp and passes through a nut 9, which is held in said bridge portion, and which preferably has a polygonal shape corresponding to that of the bridge whereby the bridge 5 prevents rotation of the nut on the screw 8. The inner end or foot of the screw 8, as indicated at 10, may rest directly upon the hose so that, upon rotation of the screw 8 in one direction, the nut and bridge will be drawn upward, and the legs 3 and 4 may be tightened about the hose 1. Rotation of the screw 8 in opposite direction, naturally will have a tendency to release the strain, and to loosen the attachment of the hose 1 to the pipe 2.

Figure 3:
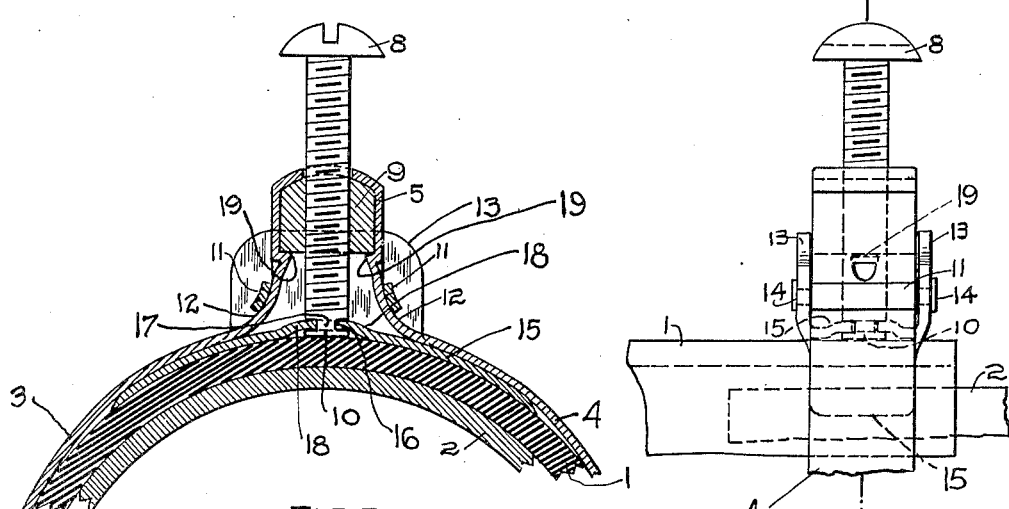
Fig. 3 shows on a larger scale a section through the clamp taken on line 3—3 of Fig. 4.
Figure 4:
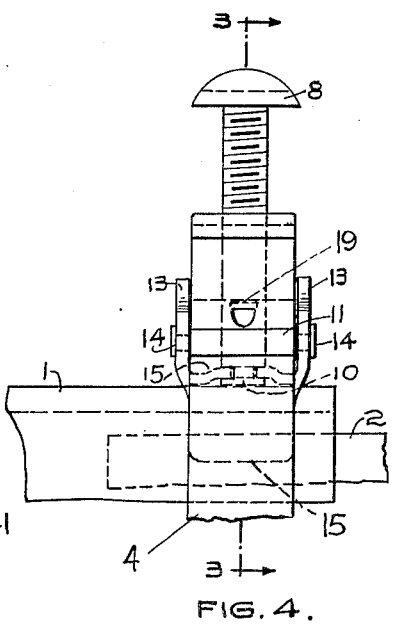
Fig. 4 is on a larger scale a side elevation of the actuating portion of the clamp.

For the purpose of improving the gripping engagement of the legs 3 and 4 with the side walls of the hose 1, means are provided which have a tendency of holding the upper portions of the legs 3 and 4 close to the side walls of the hose. These means are illustrated in the embodiment shown as members 11, which extend longitudinally of the hose and which are rigidly forced against the neck portions 12 of the legs 3 and 4 without, however, preventing their tightening or releasing movement. These members 11 are supported by walls 13 in front and rear of the head of the clamp, and they are preferably extended through the walls 13 and secured within these walls by riveting the ends, as indicated at 14. The walls 13 may be constructed as integral parts of a saddle member 15, which is provided with an opening 16 to permit the passage of the screw 8. It will be noticed from Fig. 3 that the screw is provided with a reduced portion 17 adjacent the head 10 thereof, and the opening 16 in the saddle 15 is just large enough to receive the reduced neck portion 17 of the screw. The saddle member 15 is, furthermore, reinforced by deflecting it near its center somewhat from its arcuate shape, as indicated at 18, whereby a corrugation or raised central portion for the reception of the screw 8 is provided in the curved saddle member, the radius of the saddle member corresponding otherwise approximately to the radius of the outer tubular member 1.

Owing to the provision of the restraining members 11, which firmly engage the upper parts of the leg members 3 and 4, the latter will be retained firmly in engagement over practically their entire length with the outer tubular member 1, the bars 11 serving as a means for preventing the straightening of these leg members, or for counteracting tendency to straighten in their upper part when the screw 8 is tightened.

It will also be noted that the upper portions 12 of these leg members are provided with shoulders 19 on which the nut 9 rests. These shoulders are of great advantage in the release operation of the clamp.

When the screw 8 is rotated to effect the release of the clamp the foot end 10 of the screw, resting firmly upon the upper portion of the outer tubular member, obviously will prevent longitudinal displacement of the screw, with respect to this member. The nut 9 will then be displaced downwardly in this rotation of the screw 8, and in this downward displacement it will act upon the shoulders 19, causing the legs 12 to spread, and to be disengaged from the walls of the outer tubular member.

I claim:

1. In a clamp for connecting two telescoping members, a pair of flexible legs, a bridge piece connecting said legs at one end, means for adjustably connecting the other ends of said legs, a nut held in said bridge piece against rotation, a saddle below said nut embracing said legs, and a screw extending through said nut and rotatably mounted at its inner end within said saddle.

2. In a clamp for connecting two telescoping tubular members, a pair of flexible legs, a bridge piece uniting said legs at one end, adjustable means for interconnecting the legs at their other end, means coöperating with the bridge piece for adjusting the radial distance of the bridge piece from the axis of the tubular members, and a saddle below said means embracing said legs for preventing spreading movement of the upper portions thereof near the bridge piece.

3. In a clamp for connecting two telescoping tubular members, a pair of flexible legs adjustably connected at one end, a bridge piece firmly uniting said legs at diametrically opposite ends, means for radially displacing said bridge piece with respect to the axis of the tubular members, and a saddle below said means embracing said legs for preventing spreading movement of the said legs adjacent the bridge piece.

4. In a clamp for connecting two telescoping tubular members, a pair of flexible legs embracing the outer member and provided with an integral connection at one end and with means for adjustably connecting the free ends of the legs, a saddle between the integral connection and the outer telescoping tubular member, means coöperating with said saddle for exerting a tensional strain upon said legs to force them with the said saddle into circumferential engagement with the outer tubular member, and elements on said saddle for retaining the leg portions close to the saddle and to prevent spreading thereof.

5. In a clamp for connecting two telescoping tubular members, two flexible leg portions embracing the outer tubular member, means for adjustably connecting the ends of said leg portions, a bridge piece firmly uniting the opposite ends of said leg portions, a saddle interposed between the outer tubular member and said bridge piece, means co-acting with the bridge piece for forcing the flexible legs firmly in engagement with the outer tubular member, and elements supported by said saddle piece for preventing spreading of the flexible leg portions between said bridge piece and the outer tubular member, whereby said flexible legs and said saddle will form a circumferentially engaging clamp.

6. In a clamp for connecting telescoping tubular members, a pair of flexible legs embracing the outer member, means for adjustably connecting the free ends of said legs, a bridge uniting the other ends of said legs, a saddle between the outer tubular member and the bridge, means supported by the saddle for embracing said legs at the plane of said saddle preventing spreading of the legs during the circumferential tightening of clamps, the saddle having a reinforced portion, and means extending through said reinforced portion and bridge for tightening the clamp.

7. In a clamp for connecting two telescoping members, a pair of flexible legs, a bridge piece connecting said legs at one end, means for connecting the other ends of said legs, a nut held below said bridge piece against rotation, a saddle below said nut embracing said legs, and a screw extending through said nut and rotatably mounted at its inner end within said saddle.

In witness whereof, I have hereunto subscribed my name this fourth day of December, 1919.

CHARLES VITEK.